(12) United States Patent
Pang et al.

(10) Patent No.: US 11,140,701 B2
(45) Date of Patent: Oct. 5, 2021

(54) SERVICE DATA TRANSMISSION METHOD, NETWORK DEVICE, AND TERMINAL DEVICE

(71) Applicant: HUAWEI TECHNOLOGIES CO., LTD., Guangdong (CN)

(72) Inventors: Lingli Pang, Shanghai (CN); Xiaoxiao Zheng, Shanghai (CN); Min Huang, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/271,977

(22) Filed: Feb. 11, 2019

(65) Prior Publication Data

US 2019/0174520 A1     Jun. 6, 2019

Related U.S. Application Data

(63) Continuation of application No. PCT/CN2016/094786, filed on Aug. 12, 2016.

(51) Int. Cl.
*H04W 4/00*     (2018.01)
*H04W 72/12*    (2009.01)
(Continued)

(52) U.S. Cl.
CPC ..... *H04W 72/1273* (2013.01); *H04L 65/4069* (2013.01); *H04L 67/2842* (2013.01); *H04W 4/00* (2013.01); *H04W 72/1205* (2013.01); *H04L 47/2416* (2013.01); *H04L 47/30* (2013.01); *H04L 47/80* (2013.01)

(58) Field of Classification Search
None
See application file for complete search history.

(56) References Cited

U.S. PATENT DOCUMENTS

2009/0034487 A1\* 2/2009 Lohr .................. H04L 1/1887
370/335
2011/0285818 A1\* 11/2011 Park .................. H04N 13/183
348/43
(Continued)

FOREIGN PATENT DOCUMENTS

| CN | 101175199 A | 5/2008 |
| CN | 101242430 A | 8/2008 |

(Continued)

OTHER PUBLICATIONS

PCT International Search Report and Written Opinion issued in International Application No. PCT/CN2016/094786 dated May 3, 2017, 19 pages.
(Continued)

*Primary Examiner* — Phirin Sam
(74) *Attorney, Agent, or Firm* — Fish & Richardson P.C.

(57) ABSTRACT

The present disclosure relates to service data transmission methods, network devices, and terminal devices. One example method includes obtaining, by a network device, characteristic information of service data, determining, by the network device based on the characteristic information, scheduling information for transmitting the service data, and transmitting, by the network device, the service data to a terminal device based on the scheduling information.

13 Claims, 6 Drawing Sheets

(51) Int. Cl.
*H04L 29/06* (2006.01)
*H04L 29/08* (2006.01)
*H04L 12/927* (2013.01)
*H04L 12/835* (2013.01)
*H04L 12/853* (2013.01)

(56) References Cited

U.S. PATENT DOCUMENTS

| | | | | |
|---|---|---|---|---|
| 2012/0136802 A1* | 5/2012 | McQuade | .......... | G06Q 30/0282 705/347 |
| 2012/0140633 A1 | 6/2012 | Stanwood et al. | | |
| 2013/0286879 A1 | 10/2013 | Elarabawy et al. | | |
| 2014/0161050 A1* | 6/2014 | Grinshpun | ......... | H04N 21/2393 370/329 |
| 2014/0325301 A1* | 10/2014 | Gao | ...................... | H04L 1/1867 714/748 |
| 2015/0016397 A1 | 1/2015 | Han et al. | | |
| 2015/0049602 A1* | 2/2015 | Gavita | .................. | H04W 4/029 370/229 |
| 2015/0063233 A1* | 3/2015 | Choi | ................. | H04W 52/0216 370/329 |
| 2015/0207748 A1 | 7/2015 | Stanwood et al. | | |
| 2016/0269996 A1* | 9/2016 | Wu | .................. | H04W 52/0235 |
| 2016/0353410 A1* | 12/2016 | Wang | ................ | H04W 72/1289 |
| 2016/0366069 A1* | 12/2016 | Ishihara | .................. | H04L 67/32 |

FOREIGN PATENT DOCUMENTS

| | | |
|---|---|---|
| CN | 101848494 A | 9/2010 |
| CN | 103650440 A | 3/2014 |
| CN | 104618798 A | 5/2015 |
| CN | 104980934 A | 10/2015 |
| CN | 105634993 A | 6/2016 |
| CN | 105828180 A | 8/2016 |
| EP | 0577365 A2 | 1/1994 |
| EP | 0901249 A2 | 3/1999 |
| JP | 2012191372 A | 10/2012 |

OTHER PUBLICATIONS

Extended European Search Report issued in European Application No. 16912337.9 dated May 27, 2019, 8 pages.
Office Action issued in Chinese Application No. 2016800815211 dated Jan. 5, 2021, 7 pages (with English translation).
Zhang Yong, "Distributed Real-Time Transcoding for Mobile Videos", Thesis Submitted in Partial Fulfillment of the Requirements for the Degree of Master of Engineering, Huazhong University of Science and Technology, May 2013, 6 pages (English Abstract).

* cited by examiner

SERVICE DATA TRANSMISSION METHOD, NETWORK DEVICE, AND TERMINAL DEVICE

CROSS-REFERENCE TO RELATED APPLICATIONS

This application is a continuation of International Application No. PCT/CN2016/094786, filed on Aug. 12, 2016, the disclosure of which is hereby incorporated by reference in its entirety.

TECHNICAL FIELD

Embodiments of this application relate to the communications field, and more specifically, to a service data transmission method, a network device, and a terminal device.

BACKGROUND

In a wireless communications system, a video service, especially a video live service, occupies an increasing quantity of network resources. How to ensure experience of a video service user is an urgent problem that needs to be resolved in a wireless network. From the perspective of a live service mode, live services may be classified into three types: a service in which data transmission is performed by using the wireless network in both a flow pushing process and a play process; a service in which data transmission is performed by using the wireless network only in a play process; and a service in which data transmission is performed by using the wireless network only in a flow pushing process.

In a live broadcast process, a broadcaster continually sends live content to a live server in a flow pushing process, and an audience obtains the live content in a play process, and obtains in real time information provided by the broadcaster. When service data is transmitted by using the wireless network, a network side cannot configure network resources based on a requirement of a video service user, and consequently experience of the video service user is affected.

SUMMARY

Embodiments of this application provide a service data transmission method, a network device, and a terminal device, to properly configure network resources and improve user experience.

A first aspect provides a service data transmission method, including: obtaining, by a network device, characteristic information of service data; determining, by the network device based on the characteristic information, scheduling information for transmitting the service data; and transmitting, by the network device, the service data to a terminal device based on the scheduling information.

The network device obtains the characteristic information of the service data, determines, based on the characteristic information, the scheduling information for transmitting the service data, and then transmits the service data to the terminal device based on the scheduling information, so that the network device can allocate scheduling information based on requirements of different service data, to properly use network resources and improve user experience.

In some possible implementations, the service data is video service data, and the characteristic information includes at least one of cache capability information, data frame transmission interval information, service data request period information, or mobility information.

If the service data is video service data, the characteristic information obtained by the network device may be at least one of the cache capability information, the data frame transmission interval information, the service data request period information, or the mobility information. The network device may further determine, based on the characteristic information, the scheduling information for transmitting the service data. In this way, the network device can more accurately determine the scheduling information based on a requirement of the service data, to further reduce impact on user experience.

In some possible implementations, the characteristic information may alternatively be type information of the service data, and the type information is used to differentiate a type of the service data, to be specific, whether the service data is service data to be uploaded in a flow pushing process or service data to be downloaded in a play process. The network device can differentiate different types of service data based on service type information of the service data, and allocate appropriate scheduling information to the service data, to properly use network resources.

In some possible implementations, the transmitting, by the network device, the service data to a terminal device based on the scheduling information includes: sending, by the network device, the scheduling information to the terminal device; and receiving, by the network device, the service data. The service data is sent by the terminal device based on the scheduling information.

In the flow pushing process, the network device sends the determined scheduling information to the terminal device, and the terminal device uploads the service data to the network device based on the scheduling information and the like, to ensure successful data uploading in the flow pushing process.

In some possible implementations, the transmitting, by the network device, the service data to a terminal device based on the scheduling information includes: sending, by the network device, the service data to the terminal device based on the scheduling information.

This process is corresponding to the play process. The network device sends the service data to the terminal device based on the determined scheduling information, to properly use network resources and reduce impact on user experience in the play process.

In some possible implementations, in the flow pushing process, after the network device sends a service data packet to the terminal device based on the scheduling information, the terminal device may further return feedback information of the service data packet to the network device. The feedback information also affects a transmission delay of a data packet to be sent subsequently. Therefore, when subsequently determining scheduling information of the service data, the network device may determine more appropriate scheduling information based on the scheduling information and the feedback information, so that the network device can configure scheduling information more properly, to improve user experience.

In some possible implementations, the method further includes: obtaining, by the network device, a data volume of the service data; and the determining, by the network device based on the characteristic information, scheduling information for transmitting the service data includes: determining, by the network device, the scheduling information based on the characteristic information and the data volume.

In the flow pushing process, when service data is to be transmitted, the network device may obtain a data volume of the service data that UE needs to transmit, and determine, based on the data volume and characteristic information, scheduling information for transmitting the service data. In this way, the network device can determine the scheduling information of the service data more accurately, to better ensure user experience.

In some possible implementations, the obtaining, by a network device, characteristic information of service data includes: receiving, by the network device, the characteristic information sent by the terminal device.

In the flow pushing process, before the service data is transmitted, the network device may obtain the characteristic information of the service data through reporting by the UE. In the play process, the terminal device may send characteristic information of a first data packet received by the terminal device to the network device, so that the network device can properly allocate scheduling information to a subsequent data packet based on the characteristic information.

In some possible implementations, the obtaining, by a network device, characteristic information of service data includes: receiving, by the network device, the characteristic information from a server.

In a characteristic obtaining process, the server may obtain the characteristic information that is of the service data and that is sent by the terminal device, and send the characteristic information to the network device after obtaining the characteristic information.

In some possible implementations, the service data is video service data. The obtaining, by the network device, a data volume of the service data includes: obtaining, by the network device, refresh rate information, code compression rate information, and video resolution information; and determining, by the network device, a data volume of the video service data based on the refresh rate information, the code compression rate information, and the video resolution information.

The obtaining, by the network device, a data volume of the service data may include: determining the data volume of the service data by obtaining the refresh rate information, the code compression rate information, the video resolution information, and the like of the service data. For example, a magnitude of video service data=video resolution×refresh rate×compression rate×pixel size. In this way, the network device can determine the scheduling information of the service data more accurately, to better ensure user experience.

In some possible implementations, the service data is video service data. The obtaining, by the network device, a data volume of the service data includes: obtaining, by the network device, bit rate information and play duration information of the video service data; and determining, by the network device, a data volume of the video service data based on the bit rate information and the play duration information of the video service data.

The obtaining, by the network device, a data volume of the service data may include: determining the data volume of the service data by obtaining the bit rate information and the play duration information of the service data. For example, a magnitude of video service data=bit rate×play duration. In this way, the network device can determine the scheduling information of the service data more accurately, to better ensure user experience.

In some possible implementations, the obtaining, by the network device, a data volume of the service data includes: receiving, by the network device, the data volume that is of the service data and that is sent by the terminal device when a data volume in a cache changes; or receiving, by the network device, the data volume that is of the service data and that is sent by the terminal device when a scheduling grant value in previous scheduling information is less than a data volume in a cache.

The terminal device may report the data volume of the service data when the cache changes. For example, when data in the cache increases or data in the cache reduces, the terminal device may report a data volume of current service data to the network device. The data volume may be represented by a cache size, and may be reported by using a user-plane packet header. When the terminal device needs to upload a plurality of data packets, the network device allocates the scheduling information to the terminal device, but a scheduling grant value in the scheduling information cannot match a data volume in a cache of the terminal device. For example, the scheduling grant value is far less than the data volume in the cache. In this case, the terminal device may report a data volume of current service data, so that the network device can allocate appropriate scheduling information (to be specific, a scheduling grant value) based on the data volume and the characteristic information. Therefore, subsequent service data transmission can be successfully performed.

In some possible implementations, the scheduling information includes at least one of resource configuration information, scheduling priority information, or multi-flow or multi-system configuration information.

Based on the characteristic information of the service data, the network device may determine a data transmission scheduling policy such as resources occupied for transmitting the service data, the scheduling priority information, or the multi-flow or multi-system configuration information, to ensure successful service data transmission.

A second aspect provides a service data transmission method, including: determining, by a terminal device, characteristic information of service data; and sending, by the terminal device, the characteristic information to a network device, where the characteristic information is used by the network device to determine scheduling information for transmitting the service data, and the network device transmits the service data to the terminal device based on the scheduling information.

In a flow pushing process, the terminal device determines the characteristic information of the to-be-sent service data, and sends the characteristic information to the network device, so that the network device determines the scheduling information based on the characteristic information, and transmits the service data to the terminal device based on the scheduling information. In this way, the terminal device can properly use network resources to transmit the service data to the network device, to improve resource utilization.

In some possible implementations, the service data is video service data, and the characteristic information includes at least one of cache capability information, data frame transmission interval information, service data request period information, or mobility information.

The terminal device may further determine at least one of the cache capability information, the data frame transmission interval information, the service data request period information, or the mobility information, and send the characteristic information to the network device, so that the network device can determine the scheduling information more accurately. In this way, the terminal device can properly use network resources to transmit the service data to the network device, to improve resource utilization.

In some possible implementations, the method further includes: sending, by the terminal device, a data volume of the service data to the network device, where the data volume is used by the network device to determine the scheduling information.

When service data is to be transmitted, the terminal device may report a data volume of the to-be-transmitted service data, so that the network device determines, based on the data volume and characteristic information, scheduling information for transmitting the service data, and the network device can determine the scheduling information of the service data more accurately.

In some possible implementations, after the terminal device sends a service data packet to the network device based on the scheduling information, the terminal device may further receive feedback information that is of the service data packet and that is returned by the network device. The feedback information also affects a transmission delay of a data packet to be sent subsequently. Therefore, the terminal device may select, based on the scheduling information and the feedback information, a more appropriate manner to send a remaining service data packet.

In some possible implementations, the service data is video service data. The method further includes: sending, by the terminal device, refresh rate information, code compression rate information, and video resolution information to the network device, where the refresh rate information, the code compression rate information, and the video resolution information are used by the network device to determine a data volume of the video service data, and the data volume is used by the network device to determine the scheduling information.

When the service data is video service data, the terminal device may further send the refresh rate information, the code compression rate information, and the video resolution information to the network device, so that the network device determines the data volume based on the refresh rate information, the code compression rate information, and the video resolution information, and determines, based on the data volume and the characteristic information, the scheduling information for transmitting the service data. Therefore, the network device can determine the scheduling information of the service data more accurately.

In some possible implementations, the service data is video service data. The method further includes: sending, by the terminal device, bit rate information and play duration information of the video service data to the network device, where the bit rate information and the play duration information of the video service data are used to determine a data volume of the video service data, and the data volume is used by the network device to determine the scheduling information.

When the service data is video service data, the terminal device may further send the bit rate information and the play duration information of the video service data to the network device, so that the network device determines the data volume based on the bit rate information and the play duration information of the video service data, and determines, based on the data volume and the characteristic information, the scheduling information for transmitting the service data. Therefore, the network device can determine the scheduling information of the service data more accurately.

In some possible implementations, the scheduling information includes at least one of resource configuration information, scheduling priority information, or multi-flow or multi-system configuration information.

Based on the characteristic information of the service data, the network device may determine a transmission policy such as resources occupied for transmitting the service data, the scheduling priority information, or the multi-flow or multi-system configuration information, to ensure successful service data transmission.

A third aspect provides a network device, and the network device includes modules for performing the method in the first aspect or any possible implementation of the first aspect.

A fourth aspect provides a terminal device, and the terminal device includes modules for performing the method in the second aspect or any possible implementation of the second aspect.

A fifth aspect provides a service data transmission system, including the network device in the third aspect and the terminal device in the fourth aspect.

A sixth aspect provides a network device, including a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the execution enables the processor to perform the method in the first aspect or any possible implementation of the first aspect.

A seventh aspect provides a terminal device, including a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the execution enables the processor to perform the method in the second aspect or any possible implementation of the second aspect.

An eighth aspect provides a computer storage medium. The computer storage medium stores program code, and the program code is used to indicate an instruction for performing the service data transmission method in the first aspect or any possible implementation of the first aspect.

A ninth aspect provides a computer storage medium. The computer storage medium stores program code, and the program code is used to indicate an instruction for performing the service data transmission method in the second aspect or any possible implementation of the second aspect.

Based on the foregoing technical solutions, the network device obtains the characteristic information of the service data, determines, based on the characteristic information of the service data, the scheduling information for transmitting the service data, and then transmits the service data to the terminal device based on the scheduling information, so that the network device can allocate different scheduling information to different service data, to properly use network resources and improve user experience.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

FIG. 1 is a diagram of an application scenario according to an embodiment of this application.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

This application is mainly applied to a mobile communications system. The system architecture includes a terminal device and a network device. The terminal device may also be referred to as an access terminal, a subscriber unit, a subscriber station, a mobile station, a mobile console, a remote station, a remote terminal, a mobile device, a user terminal, a terminal, a wireless communications device, a user agent, a user apparatus, or user equipment (User Equipment, UE). The access terminal may be a cellular phone, a cordless phone, a SIP (Session Initiation Protocol, Session Initiation Protocol) phone, a WLL (Wireless Local Loop, wireless local loop) station, a PDA (Personal Digital Assistant, personal digital assistant), a handheld device with a wireless communication function, a computing device, another processing device connected to a wireless modem, an in-vehicle device, a wearable device, or a terminal device in a future 5G network.

The network device may be configured to communicate with the terminal device. The network device may be a base transceiver station (Base Transceiver Station, BTS) in Global System for Mobile Communications (Global System for Mobile communications, GSM) or Code Division Multiple Access (Code Division Multiple Access, CDMA), may be a NodeB (NodeB, NB) in Wideband Code Division Multiple Access (Wideband Code Division Multiple Access, WCDMA), may be an evolved Node B (Evolved NodeB, eNB or eNodeB) in Long Term Evolution (Long Term Evolution, LTE), or may be a relay station, an access point, an in-vehicle device, a wearable device, or a network device in the future 5G network.

Alternatively, the network device may be an access network device, a core network device, or an access network device and a core network device. In an LTE system, the core network device may be a mobility management entity (Mobility Management Entity, MME), or may be a serving gateway (Serving Gateway, S-GW) or a packet data gateway (PDN Gateway, P-GW), and this is not limited in this application. In a future network evolution process, a network side device may also be a network control device or a data transmission device on a network side, and this is not limited herein.

Alternatively, the network device may be any relay device in a service data transmission process, and the relay device may also be user equipment. The network device may further include two logical functional entities: a control plane and a user plane. This is not limited in this application.

Figure 1:
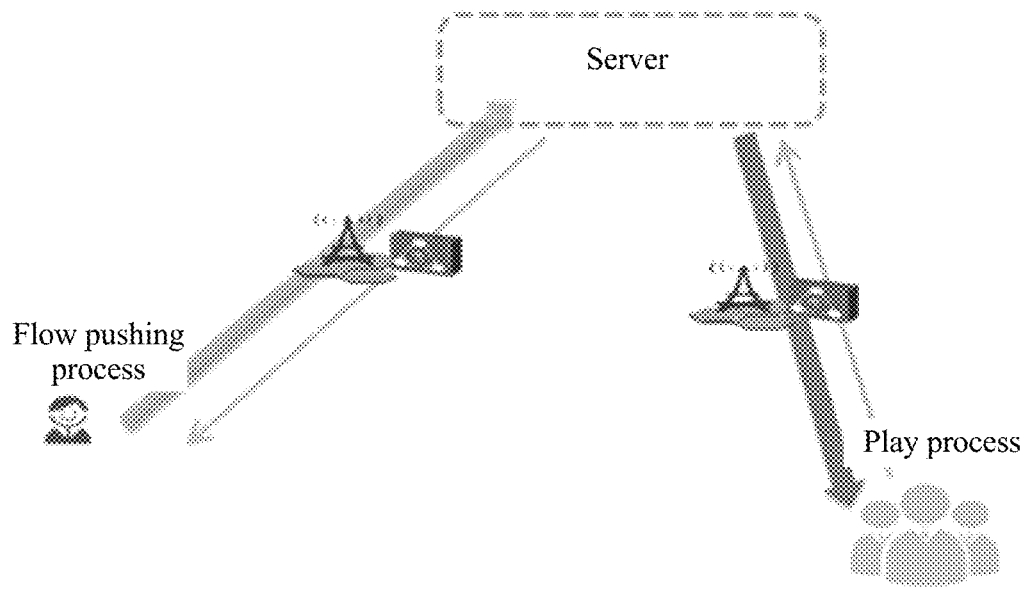

FIG. 1 shows an application scenario according to an embodiment of this application. As shown in FIG. 1, a broadcaster continually sends live content to a live server in a flow pushing process, and the broadcaster is a service source provider and is usually a terminal. An audience obtains the live content in a play process, and obtains in real time content information provided by the broadcaster. A quantity of audiences may change in real time, and the audiences are usually a plurality of terminals.

User experience is a key criterion for evaluating a video service. In the video live broadcast process, both the flow pushing process and the play process affect experience of the audience.

In a current mobile communications system, the network side usually sends video service data and other service data together in one bearer, and cannot differentiate the video service data during data scheduling. Even if the network side places only a video service data in one bearer, it is extremely difficult for the network side to obtain a requirement of a video service user precisely, and it is difficult to process a data packet of the video service user based on the requirement. Consequently, experience of the video service user is affected.

The foregoing describes in detail the communications system of the application scenario in this application with reference to FIG. 1. The following describes in detail a service data transmission method and a device that can be applied to the system.

Figure 2:
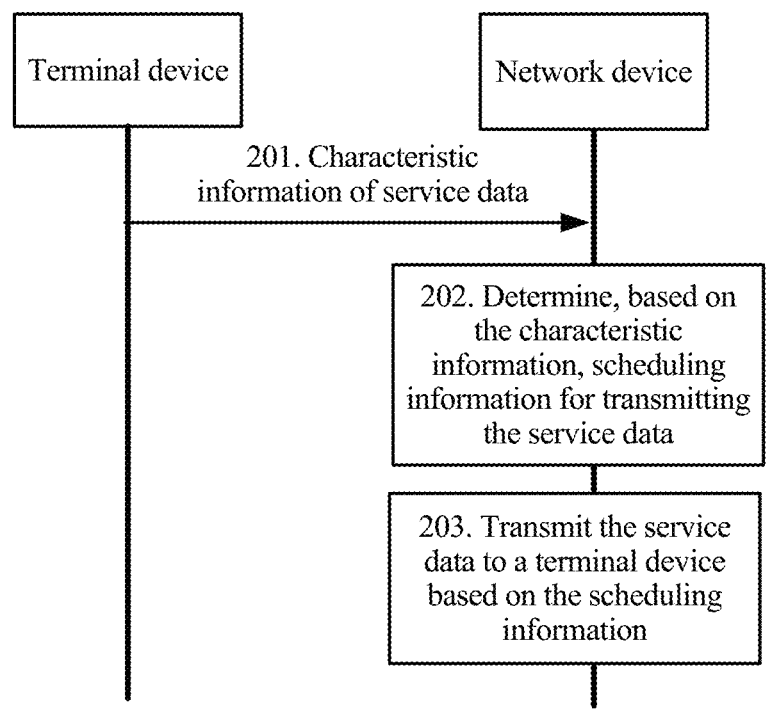
FIG. 2 is a schematic diagram of an interaction procedure in a service data transmission method according to an embodiment of this application.

The following describes in detail an embodiment of this application with reference to FIG. 2. It should be noted that the description is merely intended to help a person skilled in the art better understand this embodiment of this application, but is not intended to limit the scope of this embodiment of this application.

In an embodiment of this application, a network device obtains characteristic information of service data, and determines, based on the characteristic information, scheduling information for transmitting the service data, so that the network device can transmit the service data to a terminal device based on the scheduling information. Therefore, in this embodiment of this application, different service data can be differentiated based on characteristic information of the service data, in other words, different scheduling information is allocated to the different service data, to properly use network resources and improve user experience for high-priority service data.

In this embodiment of this application, the service data is service data of a video service, and the solution is also applicable to a non-video service. This is not limited in this application. The video service may further include a live video and a video on demand (Video On Demand, VOD), and optimization of a play process may also be applied to a VOD service.

FIG. 2 is a flowchart of interaction in a service data transmission method according to an embodiment of this application.

201. A network device obtains characteristic information of service data.

The service data may be a service data flow including a plurality of service data packets. The obtained characteristic information may be characteristic information for a first service data packet or any service data packet of a service. In other words, the characteristic information may be applied to each data packet of the service. Alternatively, the characteristic information may be characteristic information for each of a plurality of service data packets of a service. In other words, characteristic information of each data packet of the service is obtained. The data packet may be an application-layer data packet or a link-layer data packet, and this is not limited in this embodiment of this application. Optionally, the characteristic information of each data packet may be directly or indirectly obtained from another device on a network side. For example, the network device obtains the characteristic information through statistics collection or calculation of other obtained information.

If the service data is video service data, the characteristic information of the service data includes at least one of service type information, cache capability information, data frame transmission interval information, service data request period information, or mobility information. A cache capability is used to indicate whether the service data is allowed to be cached at a receive end. For example, the receive end may be any routing node, for example, a network side device or a service server, or may be user equipment, of an audience, that receives the flow data. Based on the cache capability, the network side may determine whether to discard some data packets or data frames in a transmission process. For example, if the service data is allowed to be cached at the receive end, the network side cannot discard a data packet. If the service data is not allowed to be cached at the receive end, the network side can discard a data packet based on a network status and the like. Optionally, whether the service data is allowed to be cached at the receive end depends on an application layer or a service. For example, a Hypertext Transfer Protocol (Hypertext transfer protocol, HTTP) request carries the cache capability information, and when a parameter in the cache capability information is set to no-cache (no-cache) or no-store (no-store), the service data is not allowed to be cached.

The characteristic information of the service data may include transmission bandwidth requirement information, and the transmission bandwidth requirement information is used to indicate a requirement of service data transmission for network side resources. For example, the transmission bandwidth requirement information may be at least one parameter of throughput rate information, bit rate information, or frame rate information (represented as refresh rate information) required for transmission. In an example of a live video, in a flow pushing process, the transmission bandwidth requirement information is used to indicate a requirement for an air interface resource or a requirement for a transport-layer throughput rate during service data uploading; in a play process, the transmission bandwidth requirement information is used to indicate a rate guaranteed during service data downloading to the network side. Further, the transmission bandwidth requirement information may further include key frame transmission interval information (represented as the data frame transmission interval information). A key frame is an entire frame of picture. Generally, during decoding, a picture can be obtained only by using key frame data, and decoding of a non-key frame depends on a key frame.

The characteristic information of the service data may include a data request mode, and the data request mode is a periodic request mode or an aperiodic request mode. Further, in the periodic request mode, the data request mode further includes request period information. For example, for a play process of a VOD or a live video, a terminal device determines, based on a video play situation, whether a request for downloading a next video segment needs to be initiated. Therefore, video segment downloading is usually requested periodically, and the period is play duration of one or more segments. Further, the data request mode may be a cache size and/or a cache threshold of user equipment for the service data. The network device may obtain a data request mode based on the information. For example, when the cache threshold is met, user equipment at the receive end initiates a service request, and based on the information, the network side device learns that the user equipment initiates a periodic request and learns of a period of the request.

The mobility information of the service data is used to indicate a type of the service data, especially for a video live service, and is used to differentiate whether a service data provider is mobile in the flow pushing process.

Optionally, the characteristic information of the service data may further include identifier information of the service data and/or type information of the service data.

The identifier information of the service data may be used to identify the service data corresponding to the type information. For example, the identifier information of the service data may be an Internet Protocol (Internet Protocol, IP) address or port information of a service data flow, or may be other information in an IP quintuplet, or may be an identifier of a service data flow, or the like. This is not limited in this embodiment of this application.

The type information of the service data is used to differentiate a type of the service data, and may be a video service, web page browsing, a game, or the like; or may be a video live service indicator, a flow pushing process indicator, or a video live broadcast play process indicator. The type information of the service data may also be used to differentiate different live broadcast types mainly including entertainment live broadcast and communication live broadcast. For example, the entertainment live broadcast mainly includes TV live broadcast, indoor live broadcast, or outdoor live broadcast, and the communication live broadcast mainly includes a video call. The type information is merely an example. Video services may be classified based on a characteristic of the service data, and in this case, the type information may be a short delay service and a long delay service. A difference between a long delay and a short delay is subject to a specification on the network side. Optionally, in an embodiment of this application, that a network device obtains characteristic information of service data includes: receiving, by the network device, the characteristic information sent by the terminal device. For example, UE reports the characteristic information by using control plane signaling. For example, the UE may send the characteristic information of the service data to the network device by using radio resource control (Radio Resource Control, RRC) signaling. Alternatively, the UE reports the characteristic information of the service data by using a user plane data channel, for example, adds the characteristic information to a header of a data packet. This is not limited in this embodiment of this application.

Optionally, the network device may obtain, in advance, a correspondence list of the identifier information and the type information of the service data. In this way, by obtaining either the identifier information of the service data or the type information of the service data, the network device can learn of the other piece of information by using the list. Because the list does not need to be obtained each time, network resources are saved. For example, by obtaining only the identifier information of the service data, the network device can learn of a corresponding service data type of the service data by using the list.

Optionally, in an embodiment of this application, that a network device obtains characteristic information of service data includes: receiving, by the network device, the characteristic information sent by a server.

For example, the server sends the characteristic information of the service data to the network side device by using an Rx interface, or the server sends the characteristic information of the service data to the network device by adding the characteristic information of the service data to a header of a service data packet, or the server sends the characteristic information of the service data to the network side device by using an application programming interface.

Optionally, the server may obtain the characteristic information sent by the terminal device, and then send the obtained characteristic information of the service data to the network side device. The server may send the characteristic information to the network device by using a user plane data channel, for example, indicate the characteristic information of the service data in a transport-layer header of a data packet. It should be noted that the characteristic information of the service data sent by the server to the network side device may be partial characteristic information obtained from the terminal device, and may further include characteristic information, of service data, included in the server.

Optionally, the network side may obtain partial characteristic information from the server and the terminal device separately, to obtain all required characteristic information.

Based on different functions of the characteristic information, the characteristic information may be sent to the network side in a same manner or in different manners. For example, the cache capability may be sent to the network side device by using RRC signaling in a video live broadcast start phase, the transmission bandwidth requirement information is sent by the server to the network side device by using the Rx interface in a data transmission process, and a changed parameter may be sent to the network device based on a change of the transmission bandwidth requirement. For example, in a video play or download process, the user equipment may send the transmission bandwidth requirement information to the network side device by using RRC signaling or a Transfer Control Protocol (Transfer Control Protocol, TCP) packet header when segment downloading is requested, and each segment requires reporting of a transmission bandwidth requirement parameter. A service identifier needs to be reported to the network side device only in a service start phase.

It should be noted that for a video live service, a network device that serves in the flow pushing process may be the same as or different from a network device that serves in the play process. This is not limited in this application.

It should be understood that the server may be a service providing server, for example, a video content provider or a local cache server. This is not limited in this application.

Optionally, the network device may further obtain a streaming protocol and/or a transport layer mode of the video service.

For example, the network device may transmit the service data based on the obtained streaming protocol, the obtained transport layer mode, and/or the like. For example, a streaming processing manner supported at an application layer includes the Real-Time Messaging Protocol (Real-Time Messaging Protocol, RTMP), HTTP Live Streaming (HTTP Live Streaming, HLS), Dynamic Adaptive Streaming over HTTP (Dynamic Adaptive Streaming over HTTP, DASH), HTTP progressive download (HTTP Progressive Download, HPD), HTTP adaptive streaming (HTTP Adaptive Streaming, HAS), and the like. This is not limited in this embodiment of this application. The transport layer mode includes the User Datagram Protocol (User datagram protocol, UDP), TCP, the Real-Time Transport Protocol (Real-Time Transport Protocol, RTP), and the like. This is not limited in this embodiment of this application.

202. The network device determines, based on the characteristic information of the service data, scheduling information for transmitting the service data.

Optionally, the network device may preset scheduling information corresponding to different service data, to determine the scheduling information based on the characteristic information of the service data. For example, the network device may identify the service data as flow pushing service data based on the type information of the service data, and then determine, based on the identifier information of the service data, the scheduling information preset for the service data.

It should be understood that the network device may determine the scheduling information based on the characteristic information of the service data only once at the start of transmission, and all data packets of the entire service data are sent based on the scheduling information. Alternatively, the network device may determine scheduling information for each service data packet during transmission. This is not limited in this embodiment of this application.

Optionally, in an embodiment of this application, the scheduling information includes at least one of resource configuration information, scheduling priority information, or multi-flow or multi-system configuration information.

For example, the network device may determine resources occupied for transmitting the service data, the scheduling priority information, the multi-flow or multi-system configuration information, and the like, to ensure that the flow pushing process is successfully performed. The multi-flow or multi-system configuration information is configuration information for transmitting the service data by using different channels or configuration information for transmitting the service data in different systems. Priorities of different service data flows may be preset. For example, a priority of video service data is higher than a priority of audio data. A priority of a flow pushing service of the video service data is higher than that of a play service or an interaction service. Optionally, a time limit may be set for a scheduling priority of service data. For example, the time limit is set to 100 ms, and a priority needs to be determined again 100 ms later after a priority is determined.

It should be understood that the scheduling information may further include a data volume of service data that can be uploaded by the terminal device in a period of time. The terminal device sends a sending mode parameter of the service data, admission information of the service data, multi-flow transmission information of the service data and/or access/system information of the terminal device, static or semi-persistent scheduling or continual scheduling configuration information, and the like. This is not limited in this application.

Optionally, the network device may further determine, based on at least one of the service type information, the cache capability information, the data frame transmission interval information, the service data request period information, or the mobility information, the scheduling information for transmitting the service data. The scheduling information may be any information related to a scheduling policy, and this is not limited in this application.

The cache capability information indicates whether the service data is allowed to be cached in the network device. The network device may determine, based on the cache capability information, whether to store the transmitted service data (to be specific, a data packet or a data frame) in a transmission process. If the service data is allowed to be cached, the service data is stored; if the service data is not allowed to be cached, the service data is discarded.

It should be understood that the service server, or the user equipment that receives the service data may also determine, based on the cache capability information, whether to store the service data.

The transmission bandwidth requirement information is used to indicate a requirement for an air interface resource during service data flow uploading, and may be at least one parameter of throughput rate information, bit rate information, or frame rate information (represented as refresh rate information) required for transmission. The frame rate information is a quantity of frames refreshed per second in a picture, or may be understood as a quantity of times that a graphics processing unit can perform refreshing per second. In terms of film content, a frame rate is a quantity of frames displayed per second. The network device may determine the scheduling information based on a bandwidth requirement of the service data. In other words, if the service data requires a wider bandwidth, more network resources are allocated to the service data, or if the service data requires a narrower bandwidth, fewer network resources are allocated to the service data. In this way, the network device can allocate network resources more properly, to improve network resource utilization.

For example, after identifying a type of a service data flow based on identifier information and type information of the service data flow, the network device determines, based on bit rate information of the UE, resource configuration information and a scheduling priority required for transmitting the service data, so that the network device allocates corresponding network resources, to ensure that the flow pushing process is successfully performed.

A key frame is an entire frame of picture. During decoding, a picture can be obtained only by using key frame data, and decoding of a non-key frame depends on a key frame. The network device may determine, based on a transmission interval of the key frame and the like, network resources allocated to the service data, so that network resources can be allocated more properly, and network resource utilization is improved.

Optionally, in an embodiment of this application, the characteristic information may further include a data request mode, and the data request mode is a periodic request mode or an aperiodic request mode.

For example, for the play process of the video service data, the characteristic information may further include a data request mode. The data request mode may be a periodic request mode or an aperiodic request mode. The periodic request mode further includes request period information.

Figure 3:
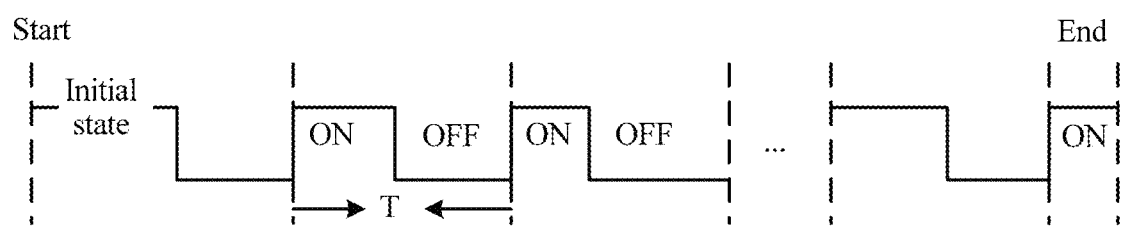
FIG. 3 is a schematic diagram of a service data transmission method according to an embodiment of this application.

For example, as shown in FIG. 3, for a video flow that includes a plurality of data packets, the terminal device may continually request a plurality of data packets, so that a quantity of service data packets in a cache or play duration meets a specific requirement, for example, is higher than a preset threshold. Then, the terminal device may periodically request and download the service data packets. For example, the period is T. Within T, ON indicates a service data download process, and OFF indicates that no data is downloaded. ON and OFF are successively repeated until the service data flow is downloaded entirely. Each period T is basically the same, but duration of ON may be different. For example, a magnitude of service data requested by the terminal device and whether a service data transmission process is successfully performed may affect duration of a download process.

Optionally, in an embodiment of this application, the method further includes: obtaining, by the network device, a data volume of the service data. That the network device determines, based on the characteristic information, scheduling information for transmitting the service data includes: determining, by the network device based on the characteristic information and the data volume, the scheduling information for transmitting the service data.

For example, in an embodiment of this application, the network device may further obtain a data volume of service data that the UE needs to transmit, and determine, based on the data volume and characteristic information, scheduling information for transmitting the service data. In this way, the network device can determine scheduling priority information and resource configuration information of the service data more accurately, or the network side can determine a scheduling mode for the service more accurately, for example, configure a continual scheduling mode or a semi-persistent scheduling mode for the service, to better ensure user experience. The continual scheduling mode or the semi-persistent scheduling mode means that the UE may continually send data for a period of time based on a scheduling grant on the network side, and in the continual sending phase, the network side does not need to send a scheduling grant for each uplink data packet. For example, duration in which sending may be continually performed is subject to configuration on the network side.

Optionally, the obtaining, by the network device, a data volume of the service data may include: determining the data volume of the service data by obtaining refresh rate information, code compression rate information, video resolution information, and the like of the service data. Alternatively, the obtaining, by the network device, a data volume of the service data may include: determining the data volume of the service data by obtaining bit rate information and play duration information of the service data.

For example, a magnitude of video service data=video resolution×refresh rate×compression rate×pixel size; or a magnitude of video service data=code rate×play duration. The compression rate information may also be an encoding mode.

It should be understood that the terminal device reports the refresh rate information, the code compression rate information, and the video resolution information of the video service data, or reports the bit rate information, the video play duration information, and the like of the video service data, so that the network device can calculate the data volume of the video service data. The reporting process may be performed only once in a service data upload process until the service is uploaded entirely.

Optionally, the terminal device may directly report the data volume of the service data that needs to be transmitted. The data volume of the service data may be a data volume in an application-layer cache, or may be a data volume in a transport-layer cache, or may be a data volume of radio link control (Radio Link Control, RLC)/Packet Data Convergence Protocol (Packet Data Convergence Protocol, PDCP). This is not limited in this embodiment of this application.

Optionally, if the data volume of the service data is the data volume of RLC/PDCP, in order that the network device can learn a data volume of to-be-transmitted service data in real time, the UE may report a data volume in a cache in real time. For example, the data volume of the service data is indicated in real time in a service data sending process.

It should be understood that when the terminal device sends the data volume of the service data, the terminal device may directly send a data volume value, or the terminal device may send indication information, and the network device learns of the data volume of the service data based on the indication information.

Optionally, the UE may report the data volume of the service data when a cache changes. For example, when data in the cache increases or data in the cache reduces, the UE may report a data volume of current service data to the network device. The data volume may be represented by a cache size, and may be reported by using a user-plane packet header. This is not limited in the present disclosure.

It should be understood that, in a service data transmission process, a data volume in an RLC/PDCP cache may always be full. To be specific, the data volume is a fixed value, and data in the cache gradually reduces when the data transmission process ends.

Optionally, the network device receives the data volume that is of the service data and that is sent by the terminal device when a scheduling grant value in previous scheduling information is less than a data volume in a cache.

When the terminal device needs to upload a plurality of data packets, the network device allocates the scheduling information to the terminal device, but a scheduling grant value in the scheduling information cannot match a data volume in a cache of the terminal device. For example, the scheduling grant value is far less than the data volume in the cache. In this case, the terminal device may report a data volume of current service data, so that the network device can allocate appropriate scheduling information (including an appropriate scheduling grant value) based on the data volume and the characteristic information. Therefore, subsequent service data transmission can be successfully performed.

203. The network device transmits the service data to a terminal device based on the scheduling information.

Optionally, that the network device transmits the service data to a terminal device based on the scheduling information includes: sending, by the network device, the scheduling information to the terminal device, and receiving, by the network device, the service data. The service data is sent by the terminal device based on the scheduling information.

For example, this process is corresponding to the flow pushing process. The network device sends the determined scheduling information to the terminal device, and the terminal device uploads the service data to the network device based on the resource configuration information, the scheduling priority information, and the like, to properly use network resources.

It should be noted that, if the network side device is an access network device, optionally, the scheduling information for transmitting the data further needs to be determined based on a policy of a core network node and a parameter of quality of service in step 202.

Figure 4:
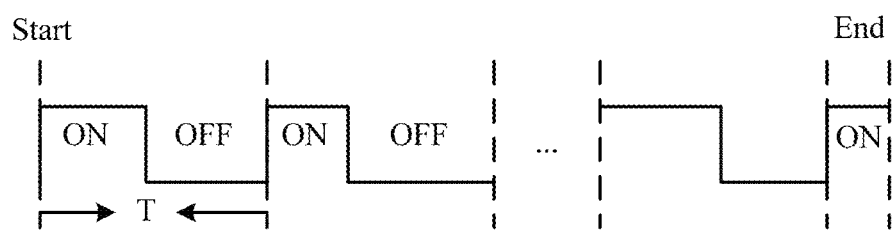
FIG. 4 is a schematic diagram of a service data transmission method according to another embodiment of this application.

Optionally, as shown in FIG. 4, in the flow pushing process, when uploading the service data to the network device, the terminal device may periodically upload a data packet. For example, the terminal device may upload a plurality of data packets in advance, and then periodically upload data packets to ensure continuous service data. Within T, ON indicates a service data upload process, and OFF indicates that no data is uploaded.

Optionally, in an embodiment of this application, in the flow pushing process, after the terminal device sends a service data packet to the network device based on the scheduling information, the terminal device may further receive feedback information that is of the service data packet and that is returned by the network device. The feedback information also affects a transmission delay of a data packet to be sent subsequently. Therefore, the terminal device may select, based on the scheduling information and the feedback information, a more appropriate manner to send a remaining service data packet.

It should be noted that the feedback information may be control information, for example, synchronization information or application-layer control information. Alternatively, the feedback information may be indication information indicating whether the service data is correctly transmitted. This is not limited in this application.

Optionally, that the network device transmits the service data to a terminal device based on the scheduling information includes: sending, by the network device, the service data to the terminal device based on the scheduling information.

For example, this process is corresponding to the play process. The network device sends the service data to the terminal device based on the determined scheduling information, to properly use network resources.

For example, the service data is video service data, and the network device may properly allocate network resources to the video service data in a play process, to improve user experience.

Optionally, in an embodiment of this application, in the play process, after the network device sends a service data packet to the terminal device based on the scheduling information, the terminal device may further return feedback information of the service data packet to the network device. The feedback information also affects a transmission delay of a data packet to be sent subsequently. Therefore, when subsequently determining scheduling information of the service data, the network device may determine more appropriate scheduling information based on the scheduling information and the feedback information, so that the network device can configure scheduling information more properly, to improve user experience.

It should be noted that the feedback information may be control information, for example, synchronization information or application-layer control information. Alternatively, the feedback information may be indication information indicating whether the service data is correctly transmitted. This is not limited in this application.

Therefore, in the service data transmission method in this embodiment of this application, the network device obtains the characteristic information of the service data, determines, based on the characteristic information of the service data, the scheduling information for transmitting the service data, and then transmits the service data to the terminal device based on the scheduling information, so that the network device can allocate scheduling information based on requirements of different service data, to properly use network resources and improve user experience.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

Figure 5:
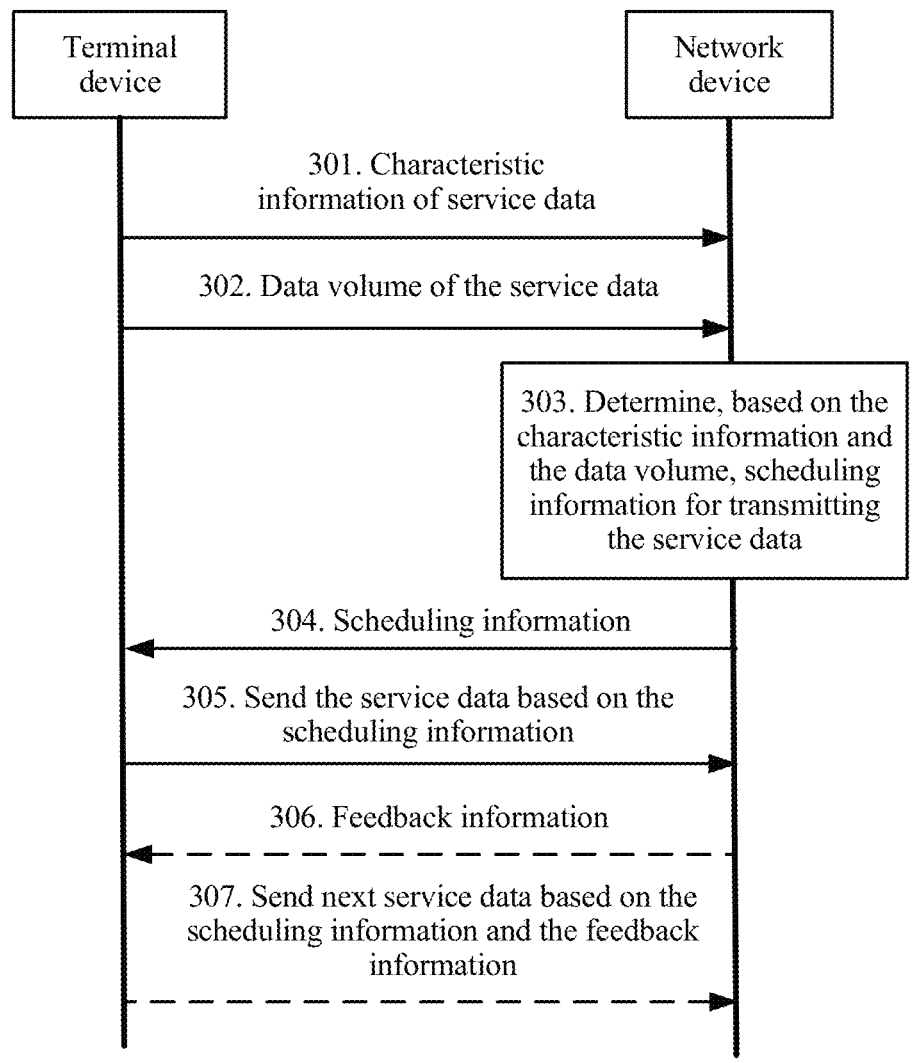
FIG. 5 is a schematic diagram of an interaction procedure in a service data transmission method according to another embodiment of this application.

The following describes in detail another embodiment of this application with reference to FIG. 5. It should be noted that the description is merely intended to help a person skilled in the art better understand this embodiment of this application, but is not intended to limit the scope of this embodiment of this application.

In an embodiment of this application, a network device obtains characteristic information of service data, determines, based on the characteristic information of the service data, scheduling information for transmitting the service data, and sends the scheduling information to a terminal device, so that the terminal device can send the service data to the network device based on the scheduling information. Therefore, in this embodiment of this application, the network device can differentiate different service data based on characteristic information of the service data, in other words, allocate scheduling information based on requirements of the different service data, to properly use network resources and improve user experience for high-priority service data.

As shown in FIG. 5, this embodiment of this application is a service data transmission method for a flow pushing process.

301. A network device obtains characteristic information of service data.

The service data may be service data of a video service, and the characteristic information includes at least one of service type information, cache capability information, data frame transmission interval information, service data request period information, or mobility information of the service data. The network device may obtain the characteristic information from a terminal device or a server, and this is not limited in this application.

302. The network device obtains a data volume of the service data.

The network device may also obtain the data volume of the service data from the server or the terminal device, and this is not limited in this application.

303. The network device determines, based on the data volume and the characteristic information that are of the service data, scheduling information for transmitting the service data.

304. The network device sends the scheduling information to a terminal device.

305. The terminal device sends the service data to the network device based on the scheduling information.

306. After receiving the service data, the network device sends feedback information of the service data to the terminal device.

307. The terminal device sends next service data to the network device based on the feedback information and the scheduling information.

Therefore, in the service data transmission method in this embodiment of this application, the network device obtains the characteristic information and the data volume that are of the service data, determines, based on the characteristic information and the data volume that are of the service data, the scheduling information for transmitting the service data, and sends the scheduling information to the terminal device, so that the terminal device sends the service data to the network device based on the scheduling information, and the network device can allocate scheduling information based on requirements of different service data, to properly use network resources and improve user experience.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

Figure 6:
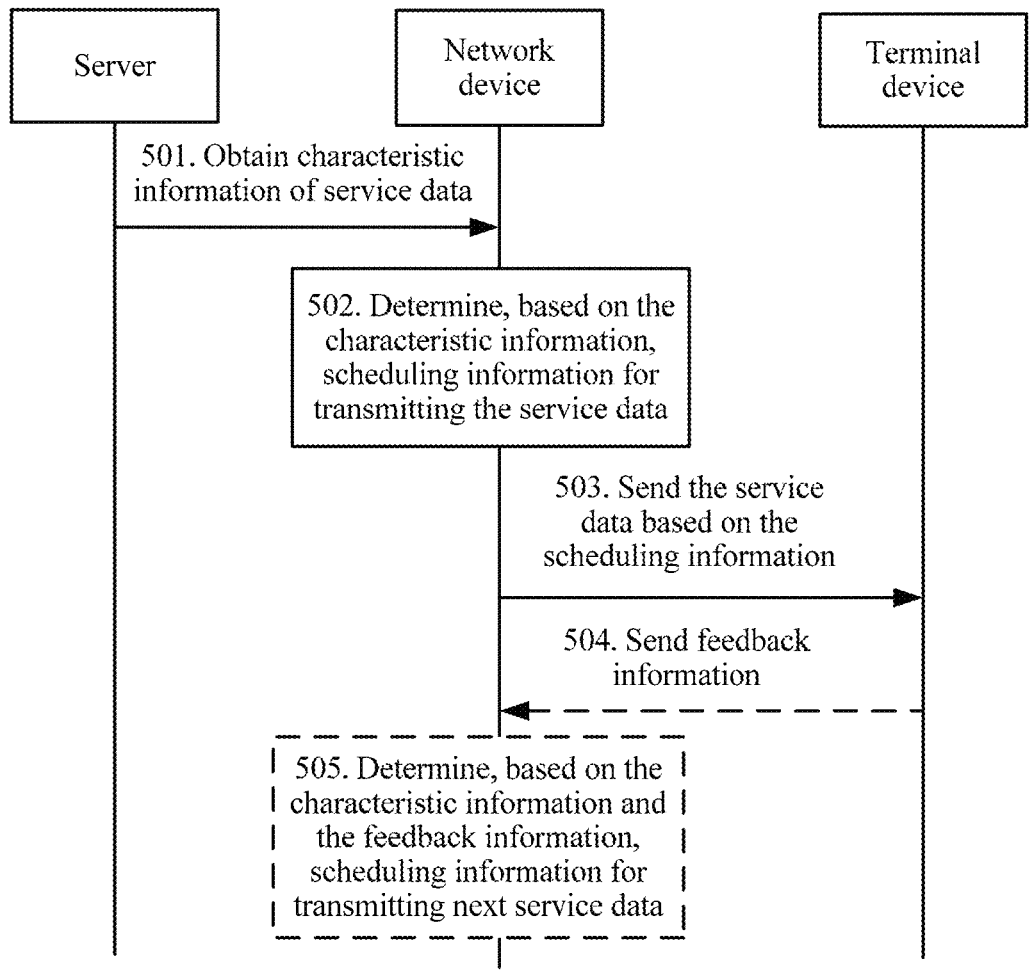
FIG. 6 is a schematic diagram of an interaction procedure in a service data transmission method according to still another embodiment of this application.

The following describes in detail another embodiment of this application with reference to FIG. 6. It should be noted that the description is merely intended to help a person skilled in the art better understand this embodiment of this application, but is not intended to limit the scope of this embodiment of this application.

In an embodiment of this application, a network device obtains characteristic information of service data, determines, based on the characteristic information of the service data, scheduling information for transmitting the service data, and then sends the service data to a terminal device based on the scheduling information. Therefore, in this embodiment of this application, the network device can differentiate different service data based on characteristic information of the service data, in other words, allocate different scheduling information to the different service data, to properly use network resources and improve user experience for high-priority service data.

As shown in FIG. 6, this embodiment of this application is a service data transmission method for a play process.

501. A network device obtains characteristic information of service data.

The service data may be service data of a video service, and the characteristic information includes at least one of service type information, cache capability information, data frame transmission interval information, service data request period information, or mobility information of the service data. The network device may obtain the characteristic information from a terminal device or a server, and this is not limited in this application.

Optionally, the network device may obtain a data volume of the service data from the server or the terminal device.

502. The network device determines, based on the characteristic information of the service data, scheduling information for transmitting the service data.

Optionally, if the network device obtains the data volume of the service data, the network device may determine, based on the data volume and the characteristic information that are of the service data, the scheduling information for transmitting the service data.

503. The network device sends the service data to a terminal device based on the scheduling information.

504. After receiving the service data, the terminal device sends feedback information of the service data to the network device.

505. The network device determines, based on the feedback information and the scheduling information, scheduling information for transmitting next service data.

It should be understood that sequence numbers of the foregoing processes do not mean execution sequences in various embodiments of the present disclosure. The execution sequences of the processes should be determined based on functions and internal logic of the processes, and should not be construed as any limitation on the implementation processes of the embodiments of the present disclosure.

Therefore, in the service data transmission method in this embodiment of this application, the network device obtains the characteristic information of the service data, determines, based on the characteristic information of the service data, the scheduling information for transmitting the service data, and then sends the service data to the terminal device based on the scheduling information, so that the network device can allocate scheduling information based on requirements of different service data, to properly use network resources and improve user experience.

The foregoing describes in detail the service data transmission method in the embodiments of this application, and the following describes a network device and a terminal device in the embodiments of this application.

Figure 7:
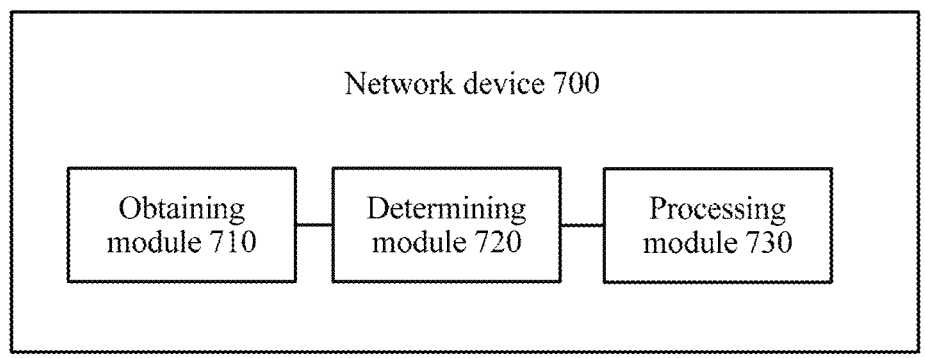
FIG. 7 is a schematic block diagram of a network device according to an embodiment of this application.

FIG. 7 is a schematic block diagram of a network device 700 according to an embodiment of this application. As shown in FIG. 7, the network device 700 includes:

an obtaining module 710, configured to obtain characteristic information of service data;

a determining module 720, configured to determine, based on the characteristic information obtained by the obtaining module 710, scheduling information for transmitting the service data; and a processing module 730, configured to transmit the service data to a terminal device based on the scheduling information determined by the determining module 720.

Therefore, the network device for service data transmission provided in this embodiment of this application obtains the characteristic information of the service data, determines, based on the characteristic information, the scheduling information for transmitting the service data, and then transmits the service data to the terminal device based on the scheduling information, so that the network device can allocate scheduling information based on requirements of different service data, to properly use network resources and improve user experience.

Optionally, in this embodiment of this application, the service data is video service data, and the characteristic information includes at least one of cache capability information, data frame transmission interval information, service data request period information, or mobility information.

Optionally, in this embodiment of this application, the obtaining module 710 is configured to receive the characteristic information sent by the terminal device.

Optionally, in this embodiment of this application, the obtaining module 710 is further configured to obtain a data volume of the service data, and the determining module 720 is configured to determine the scheduling information based on the characteristic information and the data volume.

Optionally, in this embodiment of this application, the service data is video service data. The obtaining module 710 is further configured to: obtain refresh rate information, code compression rate information, and video resolution information; and determine a data volume of the video service data based on the refresh rate information, the code compression rate information, and the video resolution information.

Optionally, in this embodiment of this application, the service data is video service data. The obtaining module 710 is further configured to: obtain bit rate information and play duration information of the video service data; and determine a data volume of the video service data based on the bit rate information and the play duration information of the video service data.

Optionally, in this embodiment of this application, the obtaining module 710 is configured to: receive the data volume that is of the service data and that is sent by the terminal device when a data volume in a cache changes; or receive the data volume that is of the service data and that is sent by the terminal device when a scheduling grant value in previous scheduling information is less than a data volume in a cache.

Optionally, in this embodiment of this application, the scheduling information includes at least one of resource configuration information, scheduling priority information, or multi-flow or multi-access configuration information.

The network device 700 in this embodiment of this application may be corresponding to the network device in the service data transmission methods in the embodiments of this application, and the foregoing and other operations and/or functions of the modules in the network device 700 are separately used to implement corresponding procedures of the methods. For brevity, details are not described herein again.

Therefore, the network device for service data transmission provided in this embodiment of this application obtains the characteristic information of the service data, determines, based on the characteristic information, the scheduling information for transmitting the service data, and then transmits the service data to the terminal device based on the scheduling information, so that the network device can allocate scheduling information based on requirements of different service data, to properly use network resources and improve user experience.

Figure 8:
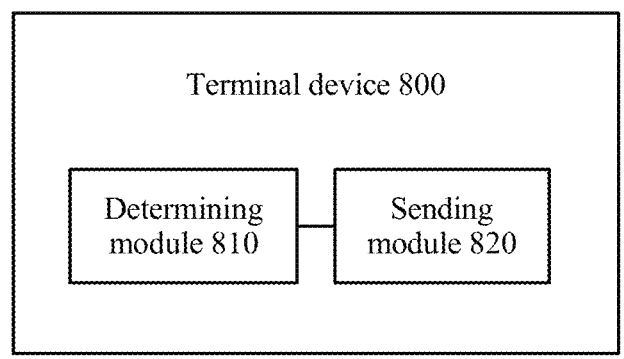
FIG. 8 is a schematic block diagram of a terminal device according to an embodiment of this application.

FIG. 8 is a schematic block diagram of a terminal device 800 according to an embodiment of this application. As shown in FIG. 8, the terminal device 800 includes:

a determining module 810, configured to determine characteristic information of service data; and a sending module 820, configured to send the characteristic information determined by the determining module to a network device, where the characteristic information is used by the network device to determine scheduling information for transmitting the service data, and the network device transmits the service data to the terminal device based on the scheduling information.

Therefore, the terminal device provided in this embodiment of this application determines the characteristic information of the to-be-sent service data, and sends the characteristic information to the network device, so that the network device determines the scheduling information based on the characteristic information, and transmits the service data to the terminal device based on the scheduling information. In this way, the terminal device can properly use network resources to transmit the service data to the network device, to improve resource utilization.

Optionally, in this embodiment of this application, the service data is video service data, and the characteristic information includes at least one of cache capability information, data frame transmission interval information, service data request period information, or mobility information.

In this embodiment of this application, optionally, the sending module 820 is further configured to send a data volume of the service data to the network device, and the data volume is used by the network device to determine the scheduling information.

Optionally, in this embodiment of this application, the service data is video service data. The sending module 820 is further configured to send refresh rate information, code compression rate information, and video resolution information to the network device. The refresh rate information, the code compression rate information, and the video resolution information are used by the network device to determine a data volume of the video service data, and the data volume is used by the network device to determine the scheduling information.

In this embodiment of this application, optionally, the service data is video service data. The sending module 820 is further configured to send bit rate information and play duration information of the video service data to the network device. The bit rate information and the play duration information of the video service data are used to determine a data volume of the video service data, and the data volume is used by the network device to determine the scheduling information.

Optionally, in this embodiment of this application, the sending module 820 is configured to: send the data volume of the service data when a data volume in a cache changes; or send the data volume of the service data when a scheduling grant value in previous scheduling information is less than a data volume in a cache.

In this embodiment of this application, optionally, the scheduling information includes at least one of resource configuration information, scheduling priority information, or multi-flow or multi-access configuration information.

The terminal device 800 in this embodiment of this application may be corresponding to the terminal device in the service data transmission methods in the embodiments of this application, and the foregoing and other operations and/or functions of the modules in the terminal device 800 are separately used to implement corresponding procedures of the methods. For brevity, details are not described herein again.

Therefore, the terminal device provided in this embodiment of this application determines the characteristic information of the to-be-sent service data, and sends the characteristic information to the network device, so that the network device determines the scheduling information based on the characteristic information, and transmits the service data to the terminal device based on the scheduling information. In this way, the terminal device can properly use network resources to transmit the service data to the network device, to improve resource utilization.

Figure 9:
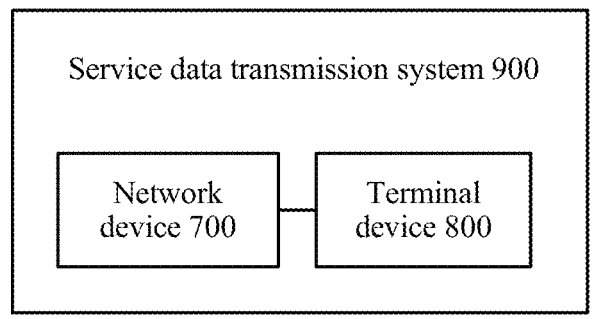
FIG. 9 is a schematic block diagram of a service data transmission system according to an embodiment of this application.

An embodiment of this application further provides a service data transmission system 900. As shown in FIG. 9, the system 900 includes:

the network device 700 in the foregoing embodiment of this application and the terminal device 800 in the foregoing embodiment of this application.

Figure 10:
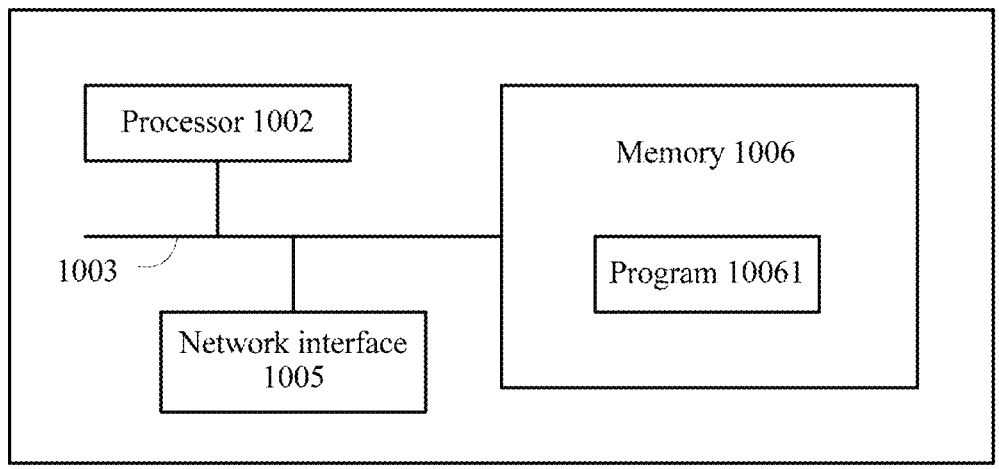
FIG. 10 is a schematic structural diagram of a network device according to an embodiment of this application.

FIG. 10 shows a structure of a network device according to an embodiment of this application. The network device includes at least one processor 1002 (for example, a general purpose processor CPU with a computing and processing capability, a digital signal processor (DSP), an application-specific integrated circuit (ASIC), or a field programmable gate array (FPGA)). The processor manages and schedules modules and components in the network device. The network device further includes at least one network interface 1005 or another communications interface, a memory 1006, and at least one bus system 1003. The components in the network device are coupled together by using the bus system 1003. The bus system 1003 may include a data bus, a power bus, a control bus, a status signal bus, and the like. For clarity of description, various buses are marked as the bus system 1003 in the figure.

The methods disclosed in the foregoing embodiments of this application may be applied to the processor 1002, or may be used to execute an executable module such as a computer program stored in the memory 1006. The memory 1006 may include a high-speed random access memory (RAM: Random Access Memory), or may include a non-volatile memory (non-volatile memory). The memory may include a read-only memory and a random access memory, and provide required signaling or data, a required program, or the like for the processor. A part of the memory may further include a non-volatile random access memory (NVRAM). A communicative connection to at least one other network element is implemented by using the at least one network interface 1005 (which may be wired or wireless).

In some implementations, the memory 1006 stores a program 10061, and the processor 1002 executes the program 10061 to perform the following operations:

obtaining characteristic information of service data by using the network interface 1005;

determining, based on the characteristic information, scheduling information for transmitting the service data; and transmitting the service data to a terminal device based on the scheduling information.

It should be noted that the network device may be the network device in the foregoing embodiments, and may be configured to perform steps and/or procedures corresponding to the network device in the foregoing method embodiments.

It can be learned from the technical solution provided in this embodiment of this application that the network device obtains the characteristic information of the service data, determines, based on the characteristic information, the scheduling information for transmitting the service data, and then transmits the service data to the terminal device based on the scheduling information, so that the network device can allocate scheduling information based on requirements of different service data, to properly use network resources and improve user experience.

Figure 11:
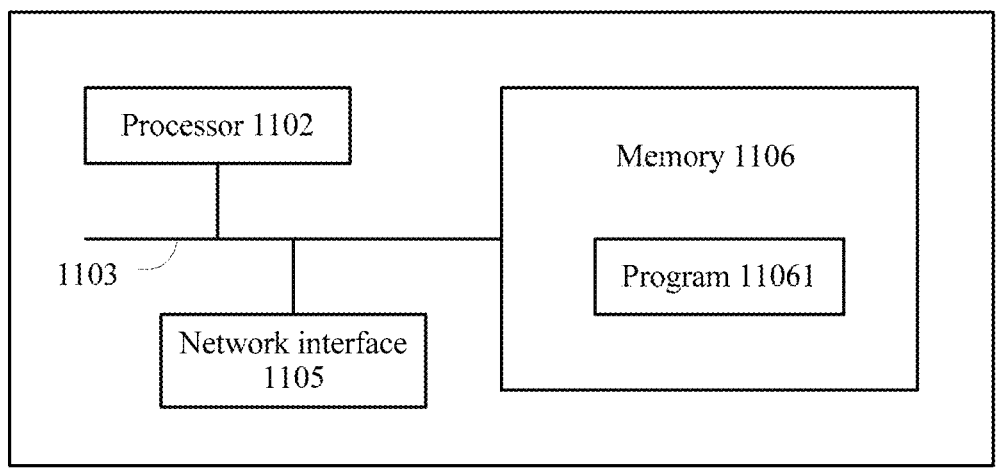
FIG. 11 is a schematic structural diagram of a terminal device according to an embodiment of this application.

FIG. 11 shows a structure of a terminal device according to an embodiment of this application. The terminal device includes at least one processor 1102 (for example, a general purpose processor CPU with a computing and processing capability, a digital signal processor (DSP), an application-specific integrated circuit (ASIC), or a field programmable gate array (FPGA)). The processor manages and schedules modules and components in terminal device. The terminal device further includes at least one network interface 1105 or another communications interface, a memory 1106, and at least one bus system 1103. All components in the terminal device may be coupled together by using the bus system 1103. The bus system 1103 may include a data bus, a power bus, a control bus, a status signal bus, and the like. For clarity of description, various buses are marked as the bus system 1103 in the figure.

The methods disclosed in the foregoing embodiments of this application may be applied to the processor 1102, or may be used to execute an executable module such as a computer program stored in the memory 1106. The memory 1106 may include a high-speed random access memory (RAM: Random Access Memory), or may include a non-volatile memory (non-volatile memory). The memory may include a read-only memory and a random access memory, and provide required signaling or data, a required program, or the like for the processor. A part of the memory may further include a non-volatile random access memory (NVRAM). A communicative connection to at least one other network element is implemented by using the at least one network interface 1105 (which may be wired or wireless).

In some implementations, the memory 1106 stores a program 11061, and the processor 1102 executes the program 11061 to perform the following operations:

determining characteristic information of service data; and sending the characteristic information to a network device by using the network interface 1105, where the characteristic information is used by the network device to determine scheduling information for transmitting the service data, and the network device transmits the service data to the terminal device based on the scheduling information.

It should be noted that the terminal device may be the terminal device in the foregoing embodiments, and may be configured to perform steps and/or procedures corresponding to the terminal device in the foregoing method embodiments.

It can be learned from the technical solution provided in this embodiment of this application that the terminal device determines the characteristic information of the to-be-sent service data, and sends the characteristic information to the network device, so that the network device determines the scheduling information based on the characteristic information, and transmits the service data to the terminal device based on the scheduling information. In this way, the terminal device can properly use network resources to transmit the service data to the network device, to improve resource utilization.

An embodiment of this application further provides a computer storage medium, and the computer storage medium may store a program instruction that is used to indicate any one of the foregoing methods.

Optionally, the storage medium may be the memory 1006 or the memory 1106.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A service data transmission method, comprising:
   determining, by a terminal device, characteristic information of video service data;
   sending, by the terminal device, the characteristic information to a network device; and
   sending, by the terminal device, refresh rate information, code compression rate information, and video resolution information of the video service data to the network device, wherein the refresh rate information, the code compression rate information, and the video resolution information of the video service data are used by the network device to determine a data volume of the video service data; or sending, by the terminal device, bit rate information and play duration information of the video service data to the network device, wherein the bit rate information and the play duration information of the video service data are used by the network device to determine the data volume of the video service data; and wherein the characteristic information and the data volume are used by the network device to determine scheduling information for transmitting the video service data, and wherein the network device transmits the video service data to the terminal device based on the scheduling information.

2. The method according to claim 1, wherein the characteristic information comprises at least one of cache capability information, data frame transmission interval information, video service data request period information, or mobility information.

3. The method according to claim 1, wherein the method further comprises at least one of:

sending, by the terminal device, the data volume of the video service data when a data volume in a cache changes; or sending, by the terminal device, the data volume of the video service data when a scheduling grant value in previous scheduling information is less than a data volume in a cache.

4. The method according to claim 1, wherein the scheduling information comprises at least one of resource configuration information, scheduling priority information, or multi-flow or multi-access configuration information.

5. A network device for service data transmission, comprising:

a receiver, the receiver configured to:

receive characteristic information of video service data from a terminal device; and receive refresh rate information, code compression rate information, and video resolution information of the video service data from the terminal device, wherein the refresh rate information, the code compression rate information, and the video resolution information of the video service data are used by the network device to determine a data volume of the video service data; or receive bit rate information and play duration information of the video service data from the terminal device, wherein the bit rate information and the play duration information of the video service data are used by the network device to determine the data volume of the video service data;

at least one processor;

one or more memories coupled to the at least one processor and storing programming instructions for execution by the at least one processor to determine, based on the characteristic information and the data volume, scheduling information for transmitting the video service data; and a transmitter, the transmitter configured to transmit the video service data to the terminal device based on the scheduling information.

6. The network device according to claim 5, wherein characteristic information comprises at least one of cache capability information, data frame transmission interval information, service data request period information, or mobility information.

7. The network device according to claim 5, wherein the receiver is configured to receive the characteristic information from the terminal device.

8. The network device according to claim 5, wherein the receiver is configured to at least one of:

receive the data volume that is of the video service data from the terminal device when a data volume in a cache changes; or receive the data volume that is of the video service data from the terminal device when a scheduling grant value in previous scheduling information is less than a data volume in a cache.

9. The network device according to claim 5, wherein the scheduling information comprises at least one of resource configuration information, scheduling priority information, or multi-flow or multi-access configuration information.

10. A terminal device for service data transmission, comprising:

at least one of processor;

one or more memories coupled to the at least one processor and storing programming instructions for execution by the at least one of processor configured to determine characteristic information of video service data; and a transmitter, the transmitter configured to:

send the characteristic information to a network device; and send refresh rate information, code compression rate information, and video resolution information of the video service data to the network device, wherein the refresh rate information, the code compression rate information, and the video resolution information of the video service data are used by the network device to determine a data volume of the video service data; or send bit rate information and play duration information of the video service data to the network device, wherein the bit rate information and the play duration information of the video service data are used by the network device to determine the data volume of the video service data; and wherein the characteristic information and the data volume are used by the network device to determine scheduling information for transmitting the video service data, and wherein the network device transmits the video service data to the terminal device based on the scheduling information.

11. The terminal device according to claim 10, wherein the characteristic information comprises at least one of cache capability information, data frame transmission interval information, video service data request period information, or mobility information.

12. The terminal device according to claim 10, wherein the transmitter is configured to at least one of:

send the data volume of the video service data when a data volume in a cache changes; or send the data volume of the video service data when a scheduling grant value in previous scheduling information is less than a data volume in a cache.

13. The terminal device according to claim 10, wherein the scheduling information comprises at least one of resource configuration information, scheduling priority information, or multi-flow or multi-access configuration information.

* * * * *